United States Patent
Chen

(10) Patent No.: US 8,240,206 B2
(45) Date of Patent: Aug. 14, 2012

(54) MOTION DETECTOR FOR ELECTRONIC DEVICES

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1294 days.

(21) Appl. No.: 11/946,259

(22) Filed: Nov. 28, 2007

(65) Prior Publication Data

US 2008/0161115 A1 Jul. 3, 2008

(30) Foreign Application Priority Data

Dec. 27, 2006 (CN) .......................... 2006 1 0201423

(51) Int. Cl.
*G01P 3/04* (2006.01)
(52) U.S. Cl. ............................................ 73/510; 453/46
(58) Field of Classification Search .................. None
See application file for complete search history.

(56) References Cited

U.S. PATENT DOCUMENTS 6,347,999 B1 2/2002 Yuan

*Primary Examiner* — Hezron E Williams
*Assistant Examiner* — Mark A Shabman
(74) *Attorney, Agent, or Firm* — Altis Law Group, Inc.

(57) ABSTRACT

A motion detector (10) includes a chamber (102), a resilient suspension arm (104), an air bearing slider (110), at least one piezoresistive sensor (106), and an infrared sensor module (112). The chamber has a front plate (1024) and a back plate (1026) located on the opposite side of the chamber, and each of the front plate and the back plate has a first through hole (1030) and a plurality of second through hole (1032) formed therein. The resilient suspension arm is arranged in the chamber, and has a free distal end (1042). The air bearing slider is moveable coupled to the free distal end of the resilient suspension arm. The at least one piezoresistive sensor is attached on the air bearing slider. The infrared sensor module is arranged on the front plate of the chamber, for sensing infrared light.

13 Claims, 4 Drawing Sheets

MOTION DETECTOR FOR ELECTRONIC DEVICES

BACKGROUND

1. Field of the Invention

The present invention relates to motion detectors which are capable of detecting a movement and thus producing a corresponding electronic signal to electronic devices.

2. Description of Related Art

Many electronic games, especially video games, usually have a game console provided to manipulates the video display signal of a display device (a television, monitor, etc.) to display a game. However, most of the video games cannot bring game players real physical interaction with the game console such that the video games become insipid. For solving the above problem, a conventional motion detector is employed in the game console to detect and simulate motion of the game players for enhancing the enjoyment of playing video games. However, the conventional motion detector cannot accurately detect the motion of the game players.

What is needed, therefore, is a motion detector which can accurately detect the motion of the game players.

SUMMARY OF THE INVENTION

A motion detector according to a present embodiment, includes a chamber, a resilient suspension arm, an air bearing slider, at least one piezoresistive sensor, and an infrared sensor module. The chamber has a front plate and a back plate located on the opposite side of the chamber, and each of the front plate and the back plate has a first through hole and a plurality of second through holes defined therein. The second through holes surround the first through hole. The resilient suspension arm is arranged in the chamber, and has a free distal end. The air bearing slider is moveably coupled to the free distal end of the resilient suspension arm. The at least one piezoresistive sensor is attached on the air bearing slider. The infrared sensor module is arranged on the front plate of the chamber, for sensing infrared light.

The present motion detector employs the at least one piezoresistive sensor, which is attached on the air bearing slider. Therefore, the motion detector may accurately sense motions of game players.

Other advantages and novel features of the present invention will become more apparent from the following detailed description of present embodiment when taken in conjunction with the accompanying drawings, in which:

BRIEF DESCRIPTION OF THE DRAWINGS

Many aspects of the present motion detector can be better understood with reference to the following drawings. The components in the drawings are not necessarily to scale, the emphasis instead being placed upon clearly illustrating the principles of the present motion detector. Moreover, in the drawings, like reference numerals designate corresponding parts throughout the several views.

DETAILED DESCRIPTION OF THE EMBODIMENT

Reference will now be made to the drawings to describe a present embodiment of the present backlight module in detail.

Figure 1:
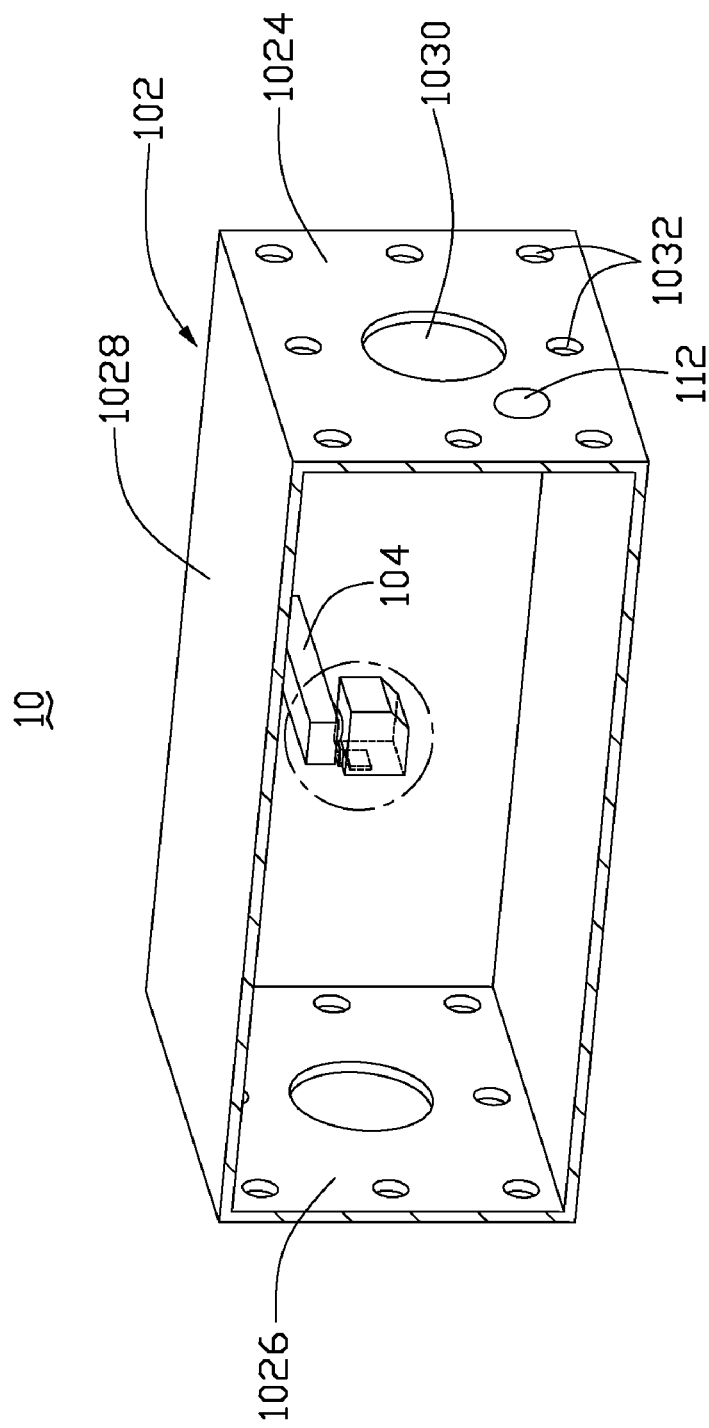
FIG. 1 is a schematic view of a motion detector according to a present embodiment of the present invention.
Figure 2:
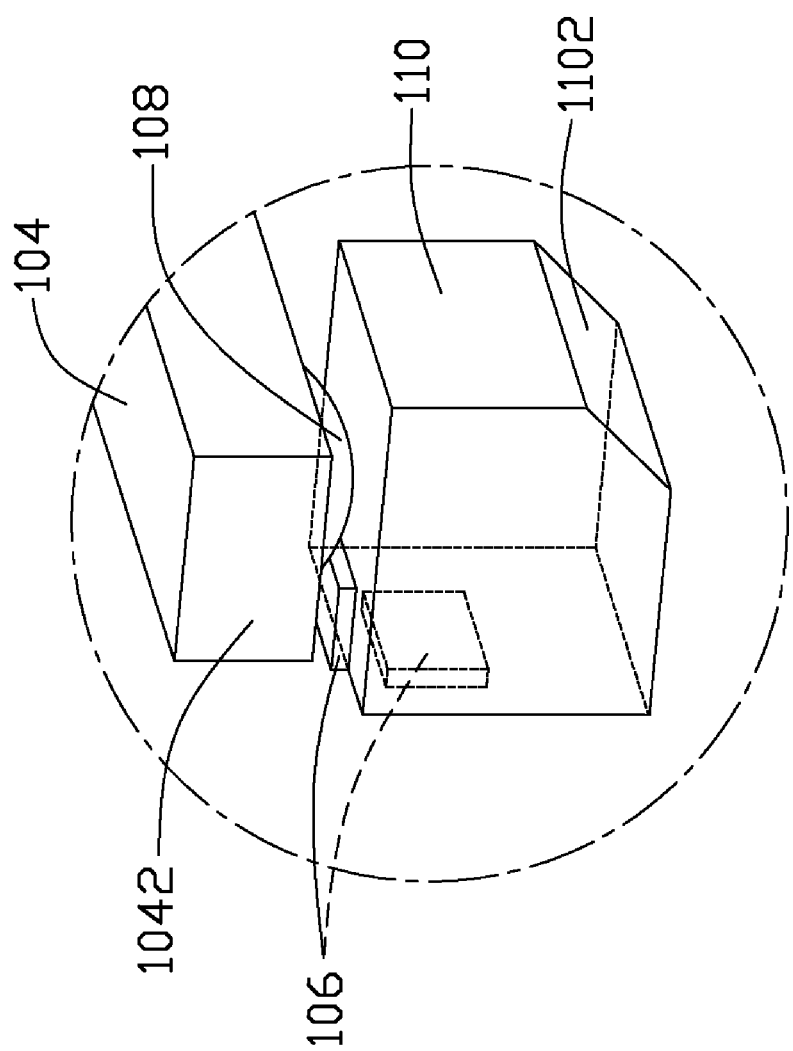
FIG. 2 is a schematic, partial-enlarged view of the motion detector of FIG. 1.

Referring to FIGS. 1 and 2, a motion detector 10 in accordance with a present embodiment, includes a chamber 102, a resilient suspension arm 104, an air bearing slider 110, at least one piezoresistive sensor 106 and an infrared sensor module 112.

The chamber 102 includes a front plate 1024 and a back plate 1026 located on the opposite side of the chamber 102. The front plate 1024 and the back plate 1026, each respectively has a first through hole 1030 and a plurality of second through holes 1032 defined therein. The first through holes 1030 are defined at a center of each of the front plate 1024 and the back plate 1026, respectively. The second through holes 1032 are distributed uniformly around of the corresponding first through holes 1030, respectively. The second through holes 1032 surround the first through holes 1030, respectively. The first through hole 1030 of the front plate 1024 is aligned with the first through hole 1030 of the back plate 1026 in a first direction. The second through holes 1032 of the front plate 1024 are aligned with the respective second through holes 1032 of the back plate 1026 in the first direction. In this exemplary embodiment, the front plate 1024 and the back plate 1026, each has eight second through holes 1032 arranged around the first through hole 1030, respectively. The first through hole 1030 is larger than each of the second through holes 1032. The first through hole 1030 has a first diameter, and each of the second through hole 1032 has a second diameter. The first diameter may be 3 to 10 times greater than the second diameter. Preferably, the first diameter is 4 to 6 times greater than the second diameter.

The first through holes 1030 and the second through holes 1032 defined on the front plate 1024 and the second plate 1026 respectively, are configured for permitting air to enter into the chamber 102 therethrough to form a laminar flow, when the motion detector 10 moves. The first through hole 1030 is configured for permitting more air to flow into the chamber 102, and the second through holes 1032 are configured for making the laminar flow distribute uniformly. The chamber 102 further includes a plurality of side plates 1028 connecting the front plate 1024 and the back plate 1026, thereby constructs an enclosed box.

The resilient suspension arm 104 is disposed in the chamber 102. The resilient suspension arm 104 has a distal end fixed on one of the side plates 1028, and a free distal end 1042 opposite thereto. The resilient suspension arm 104 may be comprised of stainless steel. The free distal end 1042 is located at a center of the chamber 102.

The air bearing slider 110 is moveably coupled to the free distal end 1042 of the resilient suspension arm 104. A joint 108 is employed to interconnect the free distal end 1042 of the resilient suspension arm 104 and the air bearing slider 110, thus the air bearing slider 110 is moveable relative to the free distal end 1042 of the resilient suspension arm 104. Preferably, the joint is a gimbal joint.

The air bearing slider 110 is arranged between the two first holes 1030 of the front plate 1024 and the back plate 1026. The air bearing slider 110 is configured for detecting the laminar flow between the front plate 1024 and the back plate 1026. Preferably, the air bearing slider 110 has an inclining surface 1102 facing towards the first hole 1030 of the front plate 1024. The inclining surface 1102 improves the sensitive capability of the motion detector 10. In operation, the inclining surface 1102 is impacted by the laminar flow, thereby the air bearing slider 110 is shaken along a flowing direction of the laminar flow. The air bearing slider 110 is comprised of a combination of aluminum oxide ($Al_2O_3$) and titanium carbide (TiC). A percentage by weight of aluminum oxide is in a range of 60% to 80%, and a percentage by weight of titanium carbide is in a range of 20% to 40%.

The at least one piezoresistive sensor 106 is attached on the air bearing slider 110 for sensing pitch, roll and yaw as associated with the motions of the motion detector 10. In this exemplary embodiment, the motion detector 10 includes two piezoresistive sensors 106, and one is attached on an upper surface of the air bearing slider 110 and another is attached to a side surface of the air bearing slider 110. The at least one piezoresistive sensor 106 is configured for sensing the laminar flow and is shaken with the air bearing slider 110 in the flowing direction of the laminar flow.

Figure 3:
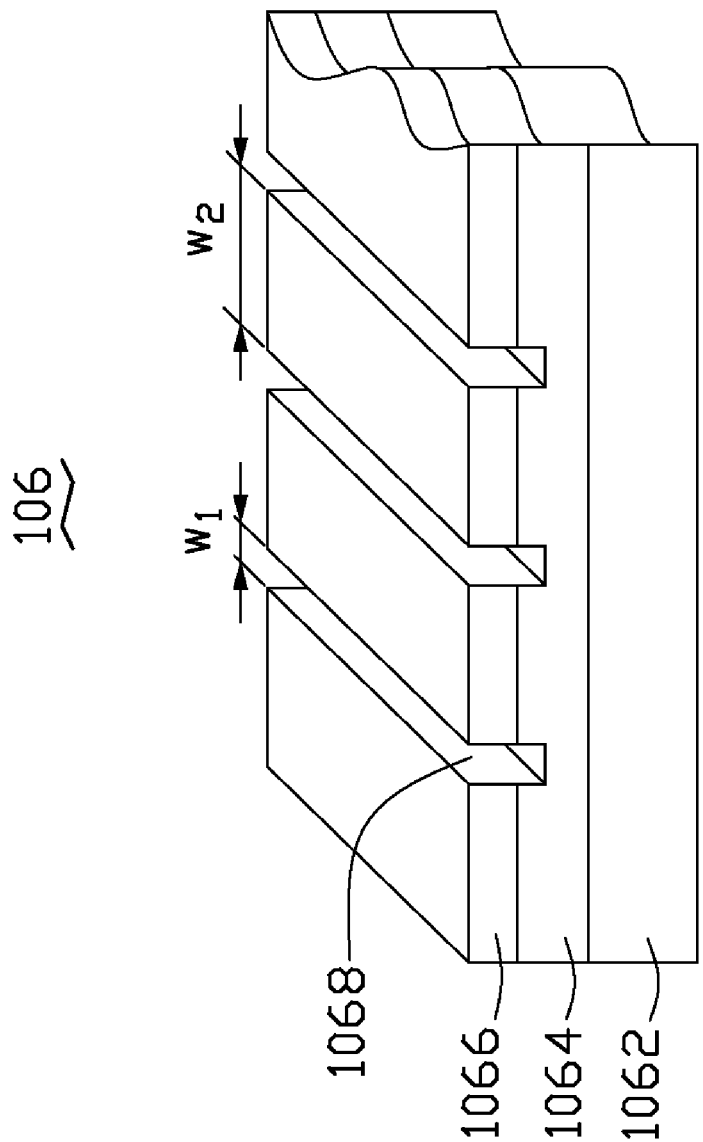
FIG. 3 is a schematic view of a piezoresistive sensor of FIG. 1.

Referring to FIG. 3, the at least one piezoresistive sensor 106 includes a substrate 1062, a silicon layer 1064 formed on the substrate 1062, and a silicon dioxide layer 1066 formed on the silicon layer 1064. The substrate 1062 is attached on the air bearing slider 110, and comprised of a material same as that of the air bearing slider 110. That is, the substrate 1062 is comprised of the combination of aluminum oxide and titanium carbide, and the percentage by weight of aluminum oxide is in a range of 60% to 80% and the percentage by weight of titanium carbide is in a range of 20% to 40%. The at least one piezoresistive sensor 106 further includes a plurality of grooves 1068 formed thereon, and each of the plurality of grooves 1068 extends from the silicon dioxide layer 1066 to the silicon layer 1064 in a thicknesswise direction. In this exemplary embodiment, the grooves 1068 are spaced a uniform interval from one another. Each of the grooves 1068 has a width W1. A distance W2 is defined between each neighboring two grooves 1068. The distance W2 can be 2 to 5 times larger than the width W1. Preferably, the distance W2 is 3 to 4 times larger than the width W1. The grooves 1068 may be formed by a reactive ion etching process. The silicon layer 1064 has a width in a range of 100 to 1000 nanometers, preferably, in a range of 200 to 500 nanometers. The silicon dioxide layer 1066 has a width in a range of 50 to 200 nanometers, preferably, in a range of 80 to 120 nanometers. The silicon dioxide layer 1066 may be manufactured by a CVD process.

Figure 4:
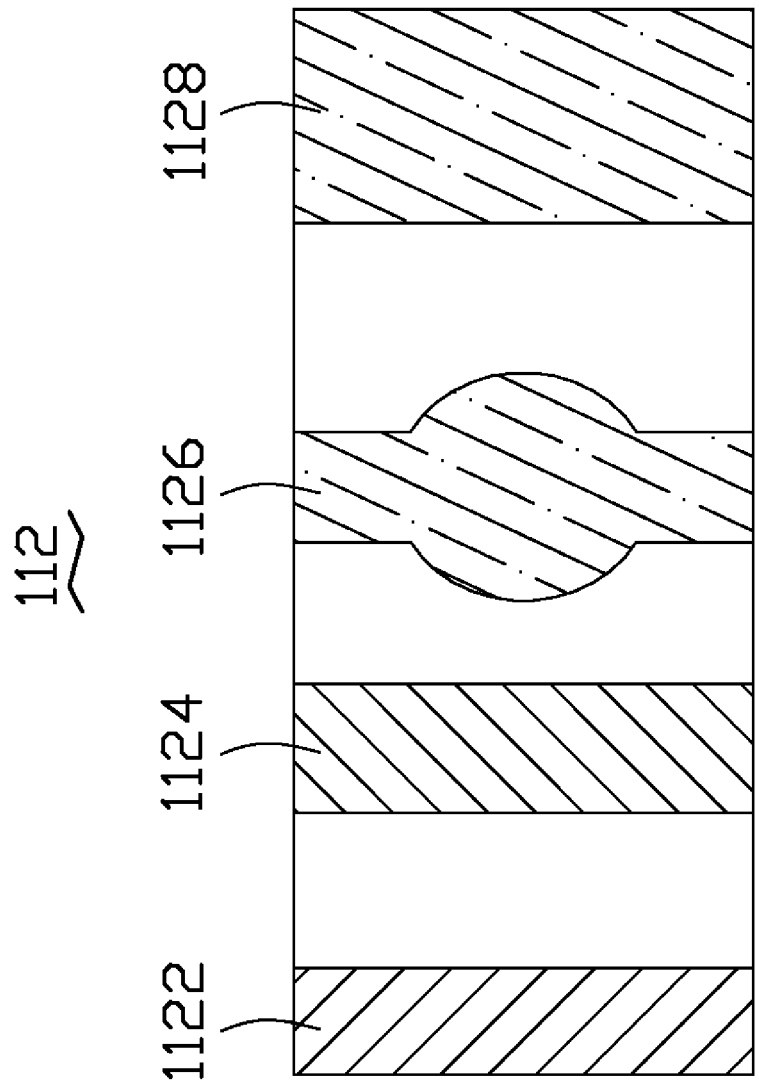
FIG. 4 is a schematic, side view of an infrared sensor module of FIG. 1.

The infrared sensor module 112 is attached on the front plate 1024 of the chamber 102. Referring to FIG. 4, the infrared sensor module 112 includes a sensor 1122, an infrared passband filter 1124, an aspherical lens 1126 and an infrared glass 1128 arranged coaxially. The sensor 1122 may be a Complementary Metal Oxide Semiconductor (CMOS) or a Charge Couple Device (CCD). The infrared glass 1128 is configured for filtering the visible light and permitting the infrared light to pass therethrough. The infrared sensor module 112 is configured for receiving the infrared light to sense the motions of the motion device 10 and produce corresponding signals.

The infrared passband filter 1124 has a high transmission capability. The transmission capability of the infrared passband filter 1124 is more than 90% for light in a range of 900~1000 nanometers and the transmission capability thereof is less than 2% for light in a range of 600~800 nanometers or light in a range of 1100~1200 nanometers. The infrared passband filter 1124 has multi-layers comprised of titanium dioxide and silicon dioxide.

In operation, when the motion detector 10 moves, the air flows into the chamber 102 to form the laminar flow and impact the air bearing slider 110, so that the at least one piezoresistive sensor 106 may accurately sense the motions of the game players to produce corresponding signals.

Furthermore, the motion detector 10 may further includes a digital signal processing board, a mother board, a blue tooth board, a RF input and output board, a power management board, a power, etc. The signals produced by the at least one piezoresistive sensor 106 and the infrared sensor module 112 may be transmitted to the digital signal processing board or the motherboard for processing. The processed signals are then transmitted out through the blue tooth board or the RF input and output board.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motion detector, comprising:
a chamber having a front plate and a back plate located on two opposite sides of the chamber, each of the front plate and the back plate having a first through hole and a plurality of second through holes defined therein, the second through holes surrounding the first through hole;
a resilient suspension arm arranged in the chamber, the resilient suspension arm having a free distal end;
an air bearing slider moveably coupled to the free distal end of the resilient suspension arm;
at least one piezoresistive sensor attached on the air bearing slider for sensing pitch, roll and yaw associated with the motions of the motion detector; and
an infrared sensor module arranged on the front plate of the chamber, for sensing infrared light.

2. The motion detector as claimed in claim 1, further comprising a gimbal joint interconnecting the free distal end of the resilient suspension arm and the air bearing slider, thus the air bearing slider being moveable relative to the free distal end of the resilient suspension arm.

3. The motion detector as claimed in claim 2, wherein the resilient suspension arm is comprised of stainless steel.

4. The motion detector as claimed in claim 1, wherein the first through hole is arranged at the center of each of the front plate and the back plate.

5. The motion detector as claimed in claim 4, wherein the first through hole is larger than each of the second through holes.

6. The motion detector as claimed in claim 5, wherein the first through hole has a first diameter, each of the second through holes has a second diameter, and the diameter of the first diameter is 3 to 10 times greater than that of the second diameter.

7. The motion detector as claimed in claim 1, wherein the air bearing slider is comprised of a combination of aluminum oxide and titanium carbide, and a percentage by weight of aluminum oxide is in a range of 60% to 80% and a percentage by weight of titanium carbide is in a range of 20% to 40%.

8. The motion detector as claimed in claim 1, wherein the at least one piezoresistive sensor includes a substrate, a silicon layer formed on the substrate, and a silicon dioxide layer formed on the silicon layer.

9. The motion detector as claimed in claim 8, wherein the substrate of the piezoresistive sensor is attached on the air bearing slider.

10. The motion detector as claimed in claim 9, wherein the substrate is comprised of a combination of aluminum oxide and titanium carbide, and a percentage by weight of aluminum oxide is in a range of 60% to 80% and a percentage by weight of titanium carbide is in a range of 20% to 40%.

11. The motion detector as claimed in claim 8, wherein the at least one piezoresistive sensor further includes a plurality of grooves formed thereon, and each of the grooves extends from the silicon dioxide layer to the silicon layer in a thicknesswise direction.

12. The motion detector as claimed in claim 11, wherein the grooves are spaced a uniform interval from one another.

13. The motion detector as claimed in claim 1, wherein the infrared sensor module includes a sensor, an infrared passband filter, an aspherical lens and an infrared glass arranged coaxially and optically.

* * * * *